United States Patent
Heitner

(10) Patent No.: US 7,988,863 B2
(45) Date of Patent: Aug. 2, 2011

(54) SILANE SUBSTITUTED POLYALKYLENE OXIDE REAGENTS AND METHODS OF USING FOR PREVENTING OR REDUCIN ALUMINOSILICATE SCALE IN INDUSTRIAL PROCESSES

(75) Inventor: Howard Heitner, Tuckahoe, NY (US)

(73) Assignee: Cytec Technology Corp., Wilmington, DE (US)

( * ) Notice: Subject to any disclaimer, the term of this patent is extended or adjusted under 35 U.S.C. 154(b) by 0 days.

(21) Appl. No.: 12/691,017

(22) Filed: Jan. 21, 2010

(65) Prior Publication Data

US 2010/0116750 A1    May 13, 2010

Related U.S. Application Data

(62) Division of application No. 11/969,461, filed on Jan. 4, 2008, now Pat. No. 7,674,385.

(60) Provisional application No. 60/888,106, filed on Feb. 5, 2007.

(51) Int. Cl.
*C02F 5/10* (2006.01)

(52) U.S. Cl. .................. 210/698; 162/DIG. 4; 252/180; 423/121

(58) Field of Classification Search .................... 210/698
See application file for complete search history.

(56) References Cited

U.S. PATENT DOCUMENTS

| | | |
|---|---|---|
| 3,509,012 A | 4/1970 | Marzocchi |
| 4,010,110 A | 3/1977 | Cosentino et al. |
| 5,085,694 A | 2/1992 | Cifuentes |
| 5,106,535 A | 4/1992 | Mutoh et al. |
| 5,360,571 A | 11/1994 | Kilgour et al. |
| 5,409,571 A | 4/1995 | Togo et al. |
| 5,527,431 A * | 6/1996 | Shetty et al. ................ 162/164.4 |
| 6,762,172 B1 | 7/2004 | Elfersy et al. |
| 6,800,330 B2 | 10/2004 | Hayashi et al. |
| 6,814,873 B2 | 11/2004 | Spitzer et al. |
| 7,390,415 B2 | 6/2008 | Spitzer et al. |
| 7,442,755 B2 | 10/2008 | Spitzer et al. |
| 7,674,385 B2 * | 3/2010 | Heitner ......................... 210/698 |
| 2005/0274926 A1 | 12/2005 | Spitzer |
| 2006/0124553 A1 | 6/2006 | Taylor et al. |
| 2007/0175821 A1 | 8/2007 | Koo et al. |
| 2008/0179564 A1 | 7/2008 | Spitzer et al. |
| 2009/0018295 A1 | 1/2009 | Spitzer et al. |
| 2009/0099328 A1 | 4/2009 | Heitner et al. |

FOREIGN PATENT DOCUMENTS

| | | |
|---|---|---|
| EP | 671450(B1) | 8/2002 |
| EP | 1630182 A2 | 3/2006 |
| JP | 2001212805 A | 8/2001 |
| JP | 2006096797 | 4/2006 |

\* cited by examiner

*Primary Examiner* — Peter A Hruskoci
(74) *Attorney, Agent, or Firm* — Charles E. Bell; Elizabeth Galletta

(57) ABSTRACT

Materials and methods are provided whereby polymers with least 0.5 mole % of the pendant group or end group containing —Si(OR")$_3$ are used to control aluminosilicate scaling in an industrial process having an alkaline process stream such as a pulping mill process stream or a high level nuclear waste processing plant. When materials of the present invention are added to the alkaline process stream, they reduce and even completely prevent formation of aluminosilicate scale on equipment surfaces such as evaporator walls and heating surfaces. The present materials are effective at treatment concentrations that make them economically practical.

13 Claims, No Drawings

SILANE SUBSTITUTED POLYALKYLENE OXIDE REAGENTS AND METHODS OF USING FOR PREVENTING OR REDUCIN ALUMINOSILICATE SCALE IN INDUSTRIAL PROCESSES

CROSS-REFERENCE TO RELATED APPLICATION(S)

This application is a divisional of U.S. application Ser. No. 11/969,461 filed Jan. 4, 2008, now U.S. Pat. No. 7,674,385, which claims benefit of priority of U.S. Provisional Application No. 60/888,106 filed Feb. 5, 2007, each of which is incorporated herein by reference in its entirety.

FIELD OF THE INVENTION

The invention describes materials and methods for preventing or inhibiting the formation of scale on or in equipment used in industrial processes having alkaline process streams.

BACKGROUND OF THE INVENTION

The problem of scaling in and on process equipment used in industrial processes and particularly in those processes having an alkaline process stream is very well known. The scales present a significant problem when they build up on the surface of process equipment and cause a loss in the heat transfer coefficient. Thus, additional heat may be required to be provided to the evaporator equipment in these processes resulting in added cost.

An example of such an industrial process having an alkaline process stream is the Kraft recovery process for manufacturing paper which has been known for over 100 years and is eloquently described in many texts on the subject (see G. A. Smook "Handbook for Pulp and paper technologists, 3rd Edition). More recently the development of closed loop cycles in kraft paper mills has resulted in an increase in scaling problems in process equipment due to the build up of aluminum and silicon in the system as is described by P. N. Wannamaker and W. J. Frederick in "Application of solubility data to predicting the accumulation of aluminum and silicon in alkaline pulp mills", Minimum Effluent Mills Symposium, 1996, p 303. It has, therefore, been a well recognized need to provide a method and compositions for inhibiting the formation of aluminosilicate scales in kraft pulp mills. U.S. Pat. No. 5,409,571 describes the use of terpolymers of maleic acid, acrylic acid and hypophosphorous acid as scale inhibitor for kraft pulp mills. This type of polymer is shown to be effective against calcium carbonate scales but has not been shown to be effective for aluminosilicate scales.

High Level Nuclear Waste (HLNW) facilities process radioactive-rich solid and liquid wastes in order to minimize waste volume and immobilize the hazardous material for long term storage. HLNW treatment is currently performed via two processes; one process is performed under acidic conditions and one under alkaline conditions. Under alkaline processing conditions, sodium aluminosilicate scale growth is a significant problem during the pretreatment stage, prior to waste vitrification.

Within the pretreatment facility, the waste is evaporated, filtered, ion exchanged and further evaporated. During evaporation, aluminosilicate scales can form on the surfaces of the evaporator walls and heating surfaces. Furthermore, transfer pipes can also become blocked due to the buildup of these scales and precipitates necessitating closure for maintenance.

The pretreated HLNW wastes go to vitrification facilities. HLNW waste goes into a melter preparation vessel where silica and other glass-forming materials are added. The mixture is then heated and the molten mixture is then poured into large stainless steel containers, cooled and moved into temporary storage until a permanent storage location is selected.

From the vitrification unit operation, a portion of the Si-containing glass-forming materials are recycled back into the evaporator unit (during pretreatment). The dissolved aluminum, in the form of sodium aluminate, and sodium silicate species react slowly in solution to form complex hydrated sodium aluminosilicate species. Among these species are families of amorphous aluminosilicates (aluminosilicate hydrogel), zeolites, sodalites, and cancrinites collectively known as "sodium aluminosilicate". These nuclear waste streams also contain high concentrations (up to 2M for each ion) of nitrate and nitrite ions, and very high concentrations (up to 16M in some sections of the tank) of $OH^-$ ions. These factors greatly enhance the rate of formation of aluminosilicate scale. As a result, sodium aluminosilicate scale formed has a low solubility in the alkaline HLNW liquor.

Also, sodium aluminosilicate scale is considered to be an undesirable HLNW product due to the incorporation of radioactive lanthanides and actinides into the aluminosilicate scale cage structures and coprecipitation of sodium diuranate. (Peterson, R. A. and Pierce, R. A., (2000), *Sodium diuranate and sodium aluminosilicate precipitation testing results*, WSRC-TR-2000-00156, Westinghouse Savannah River Company, Aiken, S.C.). It is therefore, desirable for HLNW facilities to minimize the volume of HLNW's including those resulting from aluminosilicate scales. Thus, it can be seen that, sodium aluminosilicate scale growth has a significant negative economic and operational impact on the treatment of nuclear wastes.

Therefore, it would be desirable to provide a solution to the sodium aluminosilicate scaling problem in the nuclear waste evaporators.

Attempts to solve the aforementioned problems have lead to limited success see Wilmarth and coworkers (Wilmarth, W. R., Mills, J. T. and Dukes, V. H., (2005), Removal of silicon from high-level waste streams via ferric flocculation, Separation Sci. Technol., 40, 1-11. These authors have examined the use of ferric nitrate to remove Si from solution in the form of a ferric precipitate, in order to reduce or eliminate the formation of aluminosilicate scale. Although this approach has some merit, there is still the disposal of the high-level ferric precipitate to deal with and an additional filtration unit operation is required. Also, W. R. Wilmarth and J. T. Mills "Results of Aluminosilicate Inhibitor Testing", WSRC-TR-2001-00230 have proposed using low molecular weight compounds as scale inhibitors for HLNW's but have found none to be satisfactory.

Thus there is a need for an economical and effective method for reducing aluminosilicate scale buildup on equipment used in industrial processes where such buildup is a problem as for example, the Kraft pulp paper process and in nuclear waste treatment streams.

SUMMARY OF THE INVENTION

The present invention solves the aforementioned problems and others by providing materials and a method whereby polymers having at least 0.5 mole % of the group $-Si(OR")_3$ (where R" is H, an alkyl group, Na, K, or $NH_4$) as an end group or pendant thereto are used to reduce or eliminate aluminosilicate scaling in a process having an alkaline process stream such as a kraft pulping mill or a high level nuclear waste evaporation process treatment stream. When materials of the present invention are added to these industrial process streams, they reduce and even completely prevent formation of aluminosilicate scale on the equipment surfaces. Moreover, the present materials are effective at treatment concentrations that make them economically practical.

DETAILED DESCRIPTION OF THE INVENTION

The present invention is directed to methods and materials for the reduction of aluminosilicate containing scale in an industrial process having an alkaline process stream such as in the kraft pulp mill process streams or a high level nuclear waste treatment stream. The process stream to be treated can be any process stream having an alkaline condition and in which scaling occurs, e.g. black, green and white liquors of the kraft process or a high level nuclear waste evaporation process stream.

The method comprises the step of adding to the process stream an aluminosilicate containing scale inhibiting amount of a polymer having at least 5 mole % pendant thereto a group or end group containing —Si(OR")$_3$ where R"=H, C1-C3 alkyl, aryl, Na, K or NH$_4$. The amount of —Si(OR")$_3$ functionality present in the polymer will be an amount sufficient enough to achieve the desired results and can range from a little as 0.5 mole % of the total monomer groups present in the polymer to as much as 100 mole %. However it will be most economical to use the least amount necessary to yield the desired results. The polymers are preferably prepared initially as the silylether derivatives Polymer —Si(OR")$_3$ where R"=C1-C3 alkyl, aryl, eg Polymer—Si(OCH$_2$CH$_3$)$_3$ or Polymer —Si(OCH$_3$)$_3$. The silylether derivatives may be added directly to the industrial process stream or they may be hydrolyzed to the silanol derivatives to form polymers of the following generic structures, Polymer—Si(OH)$_3$, Polymer—Si(ONa)$_3$, Polymer —Si(OK)$_3$, and Polymer —Si(ONH$_4$)$_3$ before addition to the process stream. It is a convenient feature of this invention that any of these forms may be added to the process stream. The molecular weight of the polymer should be at least about 500, most preferably at least about 1000.

In a preferred embodiment, the group containing —Si(OR")$_3$, where R"=H, C1-C3 alkyl, aryl, Na, K or NH$_4$ comprises a group according to -G-R—X—R'—Si(OR")$_3$ where G=no group, NH, NR" or O; R=no group, C=O, O, C1-C10 alkyl, or aryl; X=no group, NR, O, NH, amide, urethane, or urea; R'=no group, O, C1-C10 alkyl, or aryl; and R"=H, C1-C3 alkyl, aryl, Na, K or NH$_4$.

In one embodiment, the group is —NH—R—X—R'—Si(OR")$_3$, where R=no group, O, C1-C10 alkyl, or aryl; X=O, NH, an amide, urethane, or urea; R'=no group, O, C1-C10 alkyl, or aryl; and R"=H, C1-C3 alkyl, aryl, Na, K or NH$_4$.

In another embodiment the polymer to which the group is pendant can comprise at least one nitrogen to which the pendant group is attached. Exemplary polymers comprising at least one nitrogen to which the pendant group is attached include, but are not limited to, a polymer according to the following formula:

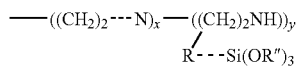

where x=0.1-100%, y=99.9-0%; and R=no group, C1-C10 alkyl, aryl, or —COX—R'—, where X=O or NH and R'=no group, C1-C10 alkyl or aryl; and R"=H, C1-C3 alkyl, aryl, Na, K or NH$_4$; wherein polymers according to the formula:

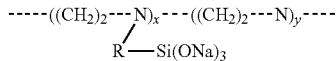

where x=0.5-20%, y=99.5-80% and R=C2-C6 are preferred, and wherein polymers according to the formula:

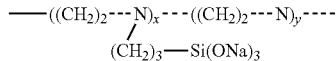

where x=0.5-20%, y=99.5-80% are specific examples.

In another embodiment the polymer having pendant thereto a group or end group containing —Si(OR")$_3$ is derived from an unsaturated polymerizable monomer containing the group —Si(OR")$_3$ where R"=H, C1-C10 alkyl, aryl, Na, K or NH$_4$ and is optionally copolymerized with one or more additional polymerizable monomer(s). Examples of such additional polymerizable monomers include but are not limited to vinylpyrrolidone, (meth)acrylamide, N-substituted acrylamides such as N-alkylacrylamides or acrylamidomethylpropanesulfonic acid, (meth)acrylic acid and salts or esters thereof, maleimides, vinyl acetate, acrylonitrile, and styrene. Particularly preferred unsaturated polymerizable monomers containing —Si(OR")$_3$ groups are monomers of formula V and VI.

Formula V:

Formula VI:

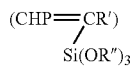

where
P=H, C1-C3 alkyl, —CO2R", —CONHR
R=C1-C10 alkyl, aryl,
R'=H, C1-3 alkyl, or aryl
X=O, NH, or NR
R"=H, C1-C3 alkyl, aryl, Na, K or NH$_4$.

Examples of such polymers include homo- and copolymers of trialkoxyvinylsilanes such as CH$_2$=CHSi(OCH$_2$CH$_3$)$_3$ and monomers of the formula VII:

Formula VII:

where P=H, R=—CH$_2$CH$_2$CH$_2$—, R'=H, X=NH and R"=H, C1-C3 alkyl, aryl, Na, K or NH$_4$.

Monomers of this type may be copolymerized with any other polymerizable monomers such as those described above. Particularly preferred copolymerizable monomers include vinylpyrrolidone, (meth)acrylamide, N-substituted (meth)acrylamides, (meth)acrylic acid and it's salts or esters and maleimides. Particularly preferred are N-substituted acrylamides containing 4-20 carbon atoms such as N-methylacrylamide, N,N-dimethylacrylamide, N-ethylacrylamide N-propylacrylamide, N-butylacrylamide, N-amylacrylamide, N-hexylacrylamide, N-penylacrylamide, N-octylacrylamide.

In a preferred embodiment a polymer according to the formula:

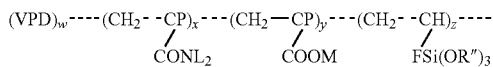

where $w=0-99\%$, $x=1-99\%$, $y=1-99\%$, $z=0.5-20\%$ and $M=H$, Na, K, $NH_4$; and $R''=H$, C1-10 alkyl, aryl, Na, K or $NH_4$; $P=H$ or $CH_3$, $L=H$, or C1-C10 alkyl, aryl or aralkyl, $F=-G-R-X-R'-Si(OR'')_3$ wherein $G=$ no group, NH, NR'' or O; $R=$ no group, $C=O$, O, C1-C10 alkyl, or aryl; $X=$ no group, NR, O, NH, amide, urethane, or urea; $R'=$ no group, O, C1-C10 alkyl, or aryl; and $R''=H$, C1-C3 alkyl, aryl, Na, K or $NH_4$ and VPD is a moeity derived from substituted or unsubstituted vinylpyrrolidone monomer. Exemplary polymers are homo- or copolymers of one or more comonomers of formulae VII:

Formula VII:

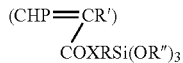

where $P=H$, $R=-CH_2CH_2CH_2-$, $R'=H$, $X=NH$ and $R''=H$, C1-C3 alkyl, aryl, Na, K or $NH_4$ wherein polymers according to the following formula:

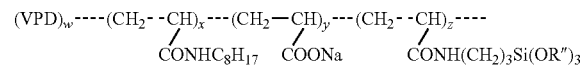

wherein $w=0-90\%$, $x=0-50\%$, $Y=0-90\%$, $Z=2-50$ mole % are specific examples.

In another embodiment, a polymer according to the formula:

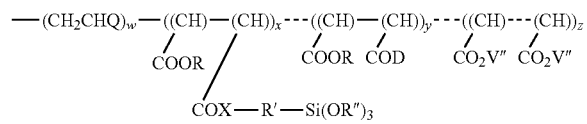

where $w=1-99.9\%$, $x=0.1-50\%$, $y=0-50\%$, $z=0-50\%$; and $Q=$C1-C10 alkyl, aryl, amide, acrylate, ether, COXR where $X=O$ or NH and $R=H$, Na, K, $NH_4$, C1-C10 alkyl or aryl, or any other substituent; $X=NH$, NP where $P=$C1-C3 alkyl or aryl, or O; $R'=$C1-10 alkyl, or aryl; $V''=H$, C1-C3 alkyl, aryl, Na, K or $NH_4$ or forms an anhydride ring; $R''=H$, C1-C3 alkyl, aryl, Na, K or $NH_4$; and $D=NR1_2$ or OR1 wherein $R1=H$, C1-C20 alkyl, C1-C20 alkenyl or aryl, with the proviso that all R, R'', V'' and R1 groups do not have to be the same, is used, and wherein polymers according to the formulae:

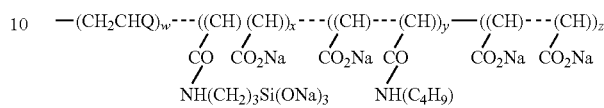

where $w=1-99.9\%$, $x=0.1-50\%$, $y=0-50\%$, $z=0-50\%$; and Q is phenyl, and:

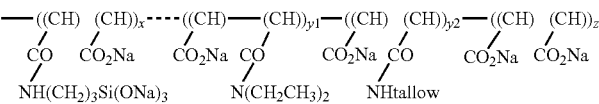

where $w=1-99.9\%$, $x=0.1-50\%$, $y1+Y2=0-50\%$, $y1$ and $y2=0-50\%$ $z=0-50\%$; and Q is phenyl are specific examples.

In another embodiment a polymer according to the formula:

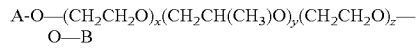

where $x=5-100\%$ (as mole %), y and $z=0-100\%$ and at least one A and/or B unit is a group containing the group $-Si(OR'')_3$, where $R''=H$, C1-C3 alkyl, aryl, Na, K or $NH_4$, is used. Exemplary such polymers include;
$A-O-(CH_2CH_2O)_x(CH_2CH(CH_3)O)_y(CH_2CH_2O)_z-O-B$ in which A and/or $B=R-Si(OR'')_3$, and $x=5-50\%$, $y=5-95\%$ and $z=0-50\%$ i.e. a copolymer of ethylene oxide and propylene oxide substituted with $-Si(OR'')_3$ groups, and $A-O-(CH_2CH_2O)_x(CH_2CH(CH_3)O)_y(CH_2CH_2O)_z-O-B$ in which A and/or $B=R-Si(OR'')_3$, $x=100\%$, $y=0\%$ and $z=0\%$ i.e., a homopolymer of polyethylene oxide substituted with $R-Si(OR'')_3$ groups is used.

In another embodiment a polymer prepared from a polysaccharide or polysaccharide derivative is used. Any polysaccharide to which the pendant $-Si(OR'')_3$ groups can be attached may be employed. Preferably the polysaccharide should be soluble in the industrial process stream such as a kraft pulping mill process streams liquor or the high level nuclear waste process stream. Polysaccharides useful in this invention include but are not limited to cellulose and it's derivatives, such as hydroxyethylcellulose, hydroxypropylcellulose, methylcellulose, hydroxybutylcellulose, carboxymethylcellulose, starch and starch derivatives such as cationic starch, guar, dextran, dextrins, xanthan, agar, carrageenan and the like. Particularly preferred are starch and cellulose derivatives wherein the reaction product of hydroxyethylcellulose with 3-glycidoxypropyltrimethoxysilane is a specific example.

The polymers used in the invention can be made in a variety of ways. For example, they can be made by polymerizing a monomer containing the group $-Si(OR'')_3$, where $R''=H$, C1-C3 alkyl, aryl, Na, K or $NH_4$, such as for example a silane monomer, or copolymerizing such a monomer with one or more co-monomers. Suitable silane monomers for use in the present invention include, but are not limited to vinyltriethoxysilane, vinyltrimethoxysilane, allyltriethoxysilane, butenyltriethoxysilane, gamma-N-acrylamidopropyltriethoxysilane, p-triethoxysilylstyrene, 2-(methyltrimethoxysilyl) acrylic acid, 2-(methyltrimethoxysilyl)-1,4 butadiene, N-triethoxysilylpropyl-maleimide and other reaction products of maleic anhydride and other unsaturated anhydrides with amino compounds containing the —Si(OR")$_3$ group. These monomers can be hydrolyzed by aqueous base, either before or after polymerization. Suitable co-monomers for use in the present invention include, but are not limited to, vinyl acetate, acrylonitrile, styrene, (meth)acrylic acid and its esters or salts, (meth)acrylamide and substituted acrylamides such as acrylamidomethylpropanesulfonic acid, N-methylacrylamide, N,N-dimethylacrylamide, N-ethylacrylamide N-propylacrylamide, N-butylacrylamide, N-amylacrylamide, N-hexylacrylamide, N-phenylacrylamide, N-octylacrylamide. The copolymers can also be graft copolymers such as polyacrylic acid-g-poly(vinyltriethoxysilane) and poly(vinyl acetate-co-crotonic acid)-g-poly(vinyltriethoxysilane). These polymers can be made in a variety of solvents. Solvents suitable for such use include, but are not limited to, acetone, tetrahydrofuran, toluene, xylene, etc. In some cases the polymer is soluble in the reaction solvent and is recovered by stripping off the solvent. Alternatively, if the polymer is not soluble in the reaction solvent, the product is recovered by filtration. Suitable initiators for use in the present invention include, but are not limited to, 2,2'azobis(2,4-dimethylvaleronitrile) and 2,2-azobisisobutyronitrile, benzoyl peroxide, and cumene hydroperoxide.

In another embodiment of the present invention, polymers useful in the invention can be made by reacting a compound containing a —Si(OR")$_3$ group as well as a reactive group that reacts with either a pendant group or backbone atom of an existing polymer. For example, polyamines and polysaccharides can be reacted with a variety of compounds containing —Si(OR")$_3$ groups to give polymers which can be used for the invention. Suitable reactive groups include, but are not limited to an alkyl halide group, such as for example, chloropropyl, bromoethyl, chloromethyl, and bromoundecyl. The compound containing —Si(OR")$_3$, can contain an epoxy functionality such as glycidoxypropyl, 1,2-epoxyamyl, 1,2-epoxydecyl or 3,4-epoxycyclohexylethyl. 3-glycidoxypropyltrimethoxysilane is a particularly preferred compound.

The reactive group can also be a combination of a hydroxyl group and a halide, such as 3-chloro-2-hydroxypropyl. The reactive moiety can also contain an isocyanate group, such as isocyanatopropyl, or isocyanatomethyl that react to form a urea linkage. In addition, silanes containing anhydride groups, such as triethoxysilylpropylsuccinic anhydride are suitable for use in making the polymers for the present invention. The reactions can be carried out either neat or in a suitable solvent. In addition, other functional groups such as alkyl groups can be added by reacting other amino groups or nitrogen atoms on the polymer with alkyl halides, epoxides or isocyanates. The polyamines can be made by a variety of methods. They can be made by a ring opening polymerization of aziridine or similar compounds. They also can be made by condensation reactions of amines such as ammonia, methylamine, dimethylamine, ethylenediamine etc. with reactive compounds such as 1,2-dichloroethane, epichlorohydrin, epibromohydrin and similar compounds.

Polymers containing anhydride groups can be reacted with a variety of compounds containing —Si(OR")$_3$ to make polymers suitable for use in the present invention. Suitable anhydride containing polymers include copolymers of maleic anhydride with ethylenically unsaturated monomers such as styrene, ethylene, alpha olefins such as octadecene, meth (acrylamide), (meth)acrylic acid, acrylate esters such as methyl (meth)acrylate, ethyl (meth)acrylate, butyl acrylate and methylvinylether. The polymer can also be a graft copolymer such as poly(1,4-butadiene)-g-maleic anhydride or polyethylene-g-maleic anhydride and the like. Other suitable anhydride monomers include, but are not limited to, itaconic and citraconic anhydrides. Suitable reactive silane compounds include, but are not limited to γ-aminopropyltriethoxysilane, bis(gamma-triethoxysilylpropyl)amine, N-phenyl-gamma aminopropyltriethoxysilane, p-aminophenyltriethoxysilane, 3-(m-aminophenoxypropyl)-trimethoxysilane, and gamma-aminobutyltriethoxylsilane. Other functional groups can be added to the polymer by reacting it with amines, alcohols and other compounds. In a preferred polymer for use in the present invention, maleic anhydride is the anhydride and the co-monomer is styrene. A preferred silane is gamma-aminopropyltriethoxysilane. It is also advantageous to react some of the anhydride groups with another amine such as diethylamine.

The same type of amino compound containing an —Si(OR")$_3$ group can be reacted with polymers containing a pendant isocyanate group, such as copolymers of for example, isopropenyldimethylbenzylisocyanate and vinyl isocyanate, with co-monomers including, but not limited to, vinyl acetate, styrene, acrylic acid, and acrylamide. These polymers can also be reacted with other compounds such as amines to enhance performance.

Isocyanate functional compounds with an —Si(OR")$_3$ group such as gamma-isocyanatopropyltrimethoxysilane can also be reacted with polymers containing hydroxyl groups such as hydrolyzed poly(vinyl acetate) and copolymers of vinyl acetate with other monomers. Other hydroxyl containing polymers suitable for use include, but are not limited to, polysaccharides and polymers containing N-methylolacrylamide.

In the present process, the amount of polymer added to the process stream can depend on the composition of the industrial process stream (e.g. a Kraft pulping mill process or high level nuclear waste streams liquor involved and generally all that is required is an aluminosilicate containing scale inhibiting amount thereof. In general the polymer is preferably added to the process stream in economically and practically favorable concentrations. A preferred concentration is one that is greater than about 0 ppm to about 300 ppm, more preferably in a concentration that is greater than about 0 ppm to about 50 ppm and most preferably the polymer is added to the process stream in a concentration that is greater than about 0 ppm to about 10 ppm.

The polymer can be added directly to any industrial process stream where scaling can occur, e.g. in the black liquor evaporators of the kraft pulp milling process, and in green and white liquor process streams of that process. It is preferred, however to add the polymer to a charge stream or recycle stream or liquor leading to the black liquor evaporator. While the polymer can be added to the industrial process stream at any time during the process, it is preferable to add it at any convenient point in the process before or during application of heat. Usually, the polymer is added immediately before the evaporator.

EXAMPLES

High Level Nuclear Waste

Comparative Example A

Preparation of the reaction product of styrene/maleic anhydride copolymer with butylamine (Comparative Polymer A)

is as follows: 10.0 g of dry styrene/maleic anhydride copolymer (SMA), with a mole ratio of styrene to maleic anhydride of about 1.1 and $M_w$ about 16,000, is suspended in 100 ml of toluene. A solution of 1.72 g of butylamine in 10 ml of toluene is added at ambient temperature. The mixture is refluxed for 3 hr. The solid product is filtered off, washed, and dried. This gives a polymer containing 53 mole % styrene, 24 mole % N-butyl half amide from maleic anhydride, and 23 mole % maleic anhydride.

Comparative Example B

Preparation of the reaction product of SMA with tallow amine and diethylamine (Comparative Polymer B) is as follows: 100.0 g of dry SMA, with a mole ratio of styrene to maleic anhydride of about 1.1 and $M_w$ about 16,000, is suspended in 941.7 g of toluene. A solution of 25.2 g tallow amine and 27.5 g diethylamine in 35.2 g toluene is added at ambient temperature and the mixture is then refluxed for 30 min. The resulting toluene slurry is cooled to room temperature and then added with mixing to about 700 ml of 2% aqueous caustic. The toluene layer is separated and the residual toluene in the aqueous phase is removed by distillation. The aqueous solution is further purified by ultrafiltration using a 0.2 μm hydrophilic polyethersulfone filter and then freeze dried to obtain the dry polymer. This gives a polymer containing 53 mole % styrene, 38 mole % N-diethyl half amide from maleic anhydride, and 9 mole % N-tallow half amide from maleic anhydride.

Comparative Example C

Preparation of a copolymer of N-tert-octylacrylamide and acrylic acid (Comparative Polymer C) is as follows: 2.81 g Acrylic acid, 2.52 g N-tert-octylacrylamide, and 0.14 g 2-mercaptoethanol are dissolved in 12.5 g DMF and 13.87 g dioxane and purged with nitrogen. The mixture is heated to 75° C. and 0.16 g 2,2'-azobis(2,4-dimethylvaleronitrile) in 3 g dioxane is added. After 6 hr at 75° C., the mixture is cooled, giving the desired polymer in solution. This gives a polymer containing 73.7 mole % acrylic acid and 26.3 mole % N-tert-octylacrylamide.

Example 1

Polymer i

Preparation of the reaction product of SMA with butylamine and (3-aminopropyl)triethoxysilane to give a polymer with 1 mole % silane containing monomer units (Polymer i) is as follows: 10.0 g of dry SMA, with a mole ratio of styrene to maleic anhydride of about 1.0 and $M_w$ about 16,000, is suspended in 100 ml of toluene. A solution of 1.72 g of butylamine and 0.21 g of (3-aminopropyl)triethoxysilane in 10 ml of toluene is added at ambient temperature. The mixture is refluxed for 3 hr. The solid product is filtered off, washed, and dried. This gives a polymer containing 53 mole % styrene, 23.9 mole % N-butyl half amide from maleic anhydride, 1 mole % N-(3-triethoxysilyl)propyl half amide from maleic anhydride, and 22.1 mole % maleic anhydride.

Example 2

Polymer ii

Preparation of the reaction product of SMA with butylamine and (3-aminopropyl)triethoxysilane to give a polymer with 3.8 mole % silane containing monomer units (Polymer ii) is as follows: 10.0 g of dry SMA, with a mole ratio of styrene to maleic anhydride of about 1.1 and $M_w$ about 16,000, is suspended in 100 ml of toluene. A solution of 1.72 g of butylamine and 0.83 g of (3-aminopropyl)triethoxysilane in 10 ml of toluene is added at ambient temperature. The mixture is refluxed for 3 hr. The solid product is filtered off, washed, and dried. This gives a polymer containing 53 mole % styrene, 23.9 mole % N-butyl half amide from maleic anhydride, 3.8 mole % N-(3-triethoxysilyl)propyl half amide from maleic anhydride, and 19.3 mole % maleic anhydride.

Example 3

Polymer iii

Preparation of the reaction product of SMA with butylamine and (3-aminopropyl)triethoxysilane to give a polymer with 7.6 mole % silane containing monomer units (Polymer iii) is as follows: 10.0 g of dry SMA, with a mole ratio of styrene to maleic anhydride of about 1.1 and $M_w$ about 16,000, is suspended in 100 ml of toluene. A solution of 1.72 g of butylamine and 1.66 g of (3-aminopropyl)triethoxysilane in 10 ml of toluene is added at ambient temperature. The mixture is refluxed for 3 hr. The solid product is filtered off, washed, and dried. This gives a polymer containing 53 mole % styrene, 23.9 mole % N-butyl half amide from maleic anhydride, 7.6 mole % N-(3-triethoxysilyl)propyl half amide from maleic anhydride, and 15.5 mole % maleic anhydride.

Example 4

Polymer iv

Preparation of the reaction product of SMA with tallow amine, diethylamine, and (3-aminopropyl)triethoxysilane to give a polymer with 3.8 mole % silane containing monomer units (Polymer iv) is as follows: 100.0 g of dry SMA, with a mole ratio of styrene to maleic anhydride of about 1.1 and $M_w$ about 16,000, is suspended in 941.7 g of toluene. A solution of 25.2 g tallow amine, 24.8 g diethylamine, and 8.3 g (3-aminopropyl)triethoxysilane in 38.9 g toluene is added at ambient temperature and the mixture is then refluxed for 30 min. The resulting toluene slurry is cooled to room temperature and then added with mixing to about 700 ml of 2% aqueous caustic. The toluene layer is separated and the residual toluene in the aqueous phase is removed by distillation. The aqueous solution is further purified by ultrafiltration using a 0.2 μm hydrophilic polyethersulfone filter and then freeze dried to obtain the dry polymer. This gives a polymer containing 53 mole % styrene, 3.8 mole % N-(3-triethoxysilyl)propyl half amide from maleic anhydride, 9.4 mole % N-tallow half amide of maleic anhydride, and 33.8 mole % N,N-diethyl half amide of maleic anhydride.

Example 5

Polymer v

Preparation of the reaction product of SMA with tallow amine, diethylamine, and (3-aminopropyl)triethoxysilane to give a polymer with 7.5 mole % silane containing monomer units (Polymer v) is as follows: 100.0 g of dry SMA, with a mole ratio of styrene to maleic anhydride of about 1.1 and $M_w$ about 16,000, is suspended in 941.7 g of toluene. A solution of 20.2 g tallow amine, 23.4 g diethylamine, and 16.7 g (3-aminopropyl)triethoxysilane in 40.2 g toluene is added at ambient temperature and the mixture is then refluxed for 30 min. The resulting toluene slurry is cooled to room temperature and then added with mixing to about 700 ml of 2% aqueous caustic. The toluene layer is separated and the residual toluene in the aqueous phase is removed by distillation. The aqueous solution is further purified by ultrafiltration using a 0.2 μm hydrophilic polyethersulfone filter and then freeze dried to obtain the dry polymer. This gives a polymer containing 53 mole % styrene, 7.5 mole % N-(3-triethoxysilyl) propyl half amide from maleic anhydride, 7.5 mole % N-tallow half amide of maleic anhydride, and 30 mole % N,N-diethyl half amide of maleic anhydride.

Example 6

Polymer vi

Preparation of the reaction product of SMA with tallow amine, diethylamine, and (3-aminopropyl)triethoxysilane to give a polymer with 3.8 mole % silane containing monomer units (Polymer vi) is as follows: 100.0 g of dry SMA, with a mole ratio of styrene to maleic anhydride of about 1.1 and $M_w$ about 16,000, is suspended in 941.7 g of toluene. A solution of 10.1 g tallow amine, 28.9 g diethylamine, and 8.3 g (3-aminopropyl)triethoxysilane in 31.3 g toluene is added at ambient temperature and the mixture is then refluxed for 30 min. The resulting toluene slurry is cooled to room temperature and then added with mixing to about 700 ml of 2% aqueous caustic. The toluene layer is separated and the residual toluene in the aqueous phase is removed by distillation. The aqueous solution is further purified by ultrafiltration using a 0.2 μm hydrophilic polyethersulfone filter and then freeze dried to obtain the dry polymer. This gives a polymer containing 53 mole % styrene, 3.8 mole % N-(3-triethoxysilyl) propyl half amide from maleic anhydride, 3.8 mole % N-tallow half amide of maleic anhydride, and 39.4 mole % N,N-diethyl half amide of maleic anhydride.

Example 7

Preparation of N-(3-triethoxysilyl)propylacrylamide (TESPA) is as follows: 197.4 g of (3-aminopropyl)triethoxysilane and 89.9 g of triethylamine are dissolved in 330 g THF, purged with nitrogen, and cooled to 0° C. With mixing, 83.9 g of acryloyl chloride is added dropwise, and after the addition the mixture is heated to 40° C. for 2 hr. The mixture is cooled to room temperature and the salt filtered out. The resulting solution of TESPA (42% in THF) is used as is without further purification.

Example 8

Polymer viii

Preparation of the tetrapolymer of N-tert-octylacrylamide, acrylic acid, 1-vinyl-2-pyrrolidinone, and TESPA to give a polymer containing 5 mole % silane containing monomer units (Polymer vii) is as follows: 1.89 g of 1-Vinyl-2-pyrrolidinone, 0.66 g acrylic acid, 2.21 g N-tert-octylacrylamide, 1.30 g TESPA (42% in THF), and 0.14 g 2-mercaptoethanol are dissolved in 14 g DMF and 11.64 g dioxane and purged with nitrogen. The mixture is heated to 75° C. and 0.16 g 2,2'-azobis(2,4-dimethylvaleronitrile) in 3 g dioxane is added. After 6 hr at 75° C., the mixture is cooled, giving the desired polymer in solution. The polymer is further purified by precipitation with isopropyl alcohol, washed, and dried. This gives a polymer containing 42.5 mole % 1-vinyl-2-pyrrolidinone, 22.5 mole % acrylic acid, 5 mole % TESPA, and 30 mole % N-tert-octylacrylamide.

Example 9

Polymer ix

Preparation of the copolymer of 1-vinyl-2-pyrrolidinone and TESPA to give a polymer containing 5 mole % silane containing monomer units (Polymer viii) is as follows: 4.69 g of 1-Vinyl-2-pyrrolidinone, 1.44 g TESPA (42% in THF), and 0.14 g 2-mercaptoethanol are dissolved in 12.5 g DMF and 13.07 g dioxane and purged with nitrogen. The mixture is heated to 75° C. and 0.16 g 2,2'-azobis(2,4-dimethylvaleronitrile) in 3 g dioxane is added. After 6 hr at 75° C., the mixture is cooled, giving the desired polymer in solution with 15% concentration. This gives a polymer containing 95 mole % 1-vinyl-2-pyrrolidinone and 5 mole % TESPA.

Example 10

Polymer x

Preparation of the terpolymer of N-tert-octylacrylamide, acrylic acid, and TESPA to give a polymer containing 5 mole % silane containing monomer units (Polymer x) is as follows: 2.46 g Acrylic acid, 2.21 g N-tert-octylacrylamide, 1.56 g TESPA (42% in THF), and 0.14 g 2-mercaptoethanol are dissolved in 12.5 g DMF and 12.97 g dioxane and purged with nitrogen. The mixture is heated to 75° C. and 0.16 g 2,2'-azobis(2,4-dimethylvaleronitrile) in 3 g dioxane is added. After 6 hr at 75° C., the mixture is cooled, giving the desired polymer in solution with 15% concentration. This gives a polymer containing 70 mole % acrylic acid, 5 mole % TESPA, and 25 mole % N-tert-octylacrylamide.

Example 11

Polymer xi

Preparation of the reaction product of polyethylene oxide with 3-glycidoxypropyltrimethoxysilane to give a polymer containing 2.2 mole % silane containing monomer units (Polymer xi) is as follows: 20.0 g of polyethyleneoxide ($M_n$ about 2000) is dissolved in 10.0 g DMSO and purged with nitrogen. To this mixture is added 2.63 g 3-glycidoxypropyltrimethoxysilane, followed by 1.36 g of 45% KOH. The resulting mixture is heated to 80° C. for 1 hr, giving the desired polymer in solution with 65.8% concentration. This gives a polymer containing about 97.8 mole % ethylene oxide and 2.2 mole % 3-glycidoxypropyltrimethoxysilane.

Example 12

Polymer xii

Preparation of the reaction product of poly(ethylene glycol)-block-poly(propylene glycol)-block-poly(ethylene glycol) with 3-glycidoxypropyltrimethoxysilane to give a polymer containing 3.1 mole % silane containing monomer units (Polymer xi) is as follows: 30.0 g of poly(ethylene glycol)-block-poly(propylene glycol)-block-poly(ethylene glycol) (with 50 wt % ethylene oxide and $M_n$ about 1900) is mixed with 4.52 g 3-glycidoxypropyltrimethoxysilane under nitrogen. 2.34 g 45% KOH is added and the resulting mixture heated to 80° C. for 1 hr, giving the desired polymer with 92.6% concentration. This gives a polymer containing about 55.1 mole % ethylene oxide, 41.8 mole % propylene oxide, and 3.1 mole % 3-glycidoxypropyltrimethoxysilane.

Example 13

Polymer xiii

Preparation of the reaction product of poly(ethylene glycol)-block-poly(propylene glycol)-block-poly(ethylene glycol) with 3-glycidoxypropyltrimethoxysilane to give a polymer containing 3.0 mole % silane containing monomer units (Polymer xiii) is as follows: 30.0 g of poly(ethylene glycol)-block-poly(propylene glycol)-block-poly(ethylene glycol) (with 10 wt % ethylene oxide and $M_n$ about 2000) is mixed with 4.3 g 3-glycidoxypropyltrimethoxysilane under nitrogen. 2.22 g 45% KOH is added and the resulting mixture heated to 80° C. for 1 hr, giving the desired polymer with 92.9% concentration. This gives a polymer containing about 12.3 mole % ethylene oxide, 84.7 mole % propylene oxide, and 3.0 mole % 3-glycidoxypropyltrimethoxysilane.

Example 14

Polymer xiv

Preparation of the reaction product of polyethylenimine with 3-glycidoxypropyltrimethoxysilane to give a polymer containing 0.5 mole % silane containing monomer units (Polymer xiv) is as follows: 25.4 g Polyethylenimine ($M_w$ about 25,000) is mixed with 0.7 g 3-glycidoxypropyltrimethoxysilane, and the resulting mixture is heated at 70° C. for 16 hr, giving the desired polymer as a soft friable gel.

Example 15

Polymer xv

Preparation of the reaction product of polyethylenimine with 3-glycidoxypropyltrimethoxysilane to give a polymer containing 1.0 mole % silane containing monomer units (Polymer xv) is as follows: 25.72 g Polyethylenimine ($M_w$ about 25,000) is mixed with 1.43 g 3-glycidoxypropyltrimethoxysilane, and the resulting mixture is heated at 70° C. for 16 hr, giving the desired polymer as a soft friable gel.

Example 16

Polymer xvi

Preparation of the reaction product of polyethylenimine with 3-glycidoxypropyltrimethoxysilane to give a polymer containing 2.0 mole % silane containing monomer units (Polymer xvi) is as follows: 11.39 g Polyethylenimine ($M_w$ about 25,000) is mixed with 1.28 g 3-glycidoxypropyltrimethoxysilane, and the resulting mixture is heated at 70° C. for 16 hr, giving the desired polymer as a soft friable gel.

Example 17

Polymer xvii

Preparation of the reaction product of polyethylenimine with 3-glycidoxypropyltrimethoxysilane to give a polymer containing 4.0 mole % silane containing monomer units (Polymer xvii) is as follows: 10.0 g Polyethylenimine ($M_w$ about 25,000) is mixed with 2.29 g 3-glycidoxypropyltrimethoxysilane, and the resulting mixture is heated at 70° C. for 16 hr, giving the desired polymer as a soft friable gel.

Example 18

Polymer xviii

Preparation of the reaction product of hydroxyethyl cellulose with 3-glycidoxypropyltrimethoxysilane to give a polymer containing a high (~30 mole %) silane containing monomer units (Polymer xviii) is as follows: 8.0 g dry hydroxyethyl cellulose (molecular weight 24,000-27,000) is mixed with 2.0 g 3-glycidoxypropyltrimethoxysilane in 5 g acetone. The acetone is removed by evaporation and the resulting mixture heated at 100° C. for 16 hr, giving the desired polymer.

TABLE 1

Summary of Polymers Used in Scale Inhibition Testing

| Example | Polymer | Composition | Mole % Silane* |
|---|---|---|---|
| Comparative A | Comparative A | Reaction product of SMA with butylamine | 0 |
| Comparative B | Comparative B | Reaction product of SMA with tallow amine and diethylamine | 0 |
| Comparative C | Comparative C | Copolymer of N-tert-octylamide and acrylic acid | 0 |
| | Comparative D | Polyethylenimine ($M_w$~25,000) obtained from Aldrich | 0 |
| | Comparative E | Polyvinylpyrrolidone ($M_w$~10,000) from Aldrich | 0 |
| 1 | i | Reaction product of SMA with butylamine and (3-aminopropyl)triethoxysilane | 1 |
| 2 | ii | reaction product of SMA with butylamine and (3-aminopropyl)triethoxysilane | 3.8 |
| 3 | iii | reaction product of SMA with butylamine and (3-aminopropyl)triethoxysilane | 7.6 |
| 4 | iv | Reaction product of SMA with tallow amine, diethylamine, and (3-aminopropyl)triethoxysilane | 3.8 |
| 5 | v | reaction product of SMA with tallow amine, diethylamine, and (3-aminopropyl)triethoxysilane | 7.5 |
| 6 | vi | reaction product of SMA with tallow amine, diethylamine, and (3-aminopropyl)triethoxysilane | 3.8 |
| 8 | viii | tetrapolymer of N-tert-octylacrylamide, acrylic acid, 1-vinyl-2-pyrrolidinone, and TESPA | 5 |
| 9 | ix | copolymer of 1-vinyl-2-pyrrolidinone and TESPA | 5 |
| 10 | x | terpolymer of N-tert-octylacrylamide, acrylic acid, and TESPA | 5 |
| 11 | xi | reaction product of polyethylene oxide with 3-glycidoxypropyltrimethoxysilane | 2.2 |
| 12 | xii | reaction product of poly(ethylene glycol)-block-poly(propylene glycol)-block-poly(ethylene glycol) with 3-glycidoxypropyltrimethoxysilane | 3.1 |

TABLE 1-continued

Summary of Polymers Used in Scale Inhibition Testing

| Example | Polymer | Composition | Mole % Silane* |
|---|---|---|---|
| 13 | xiii | reaction product of poly(ethylene glycol)-block-poly(propylene glycol)-block-poly(ethylene glycol) with 3-glycidoxypropyl-trimethoxysilane | 3.0 |
| 14 | xiv | reaction product of polyethylenimine with 3-glycidoxypropyltri-methoxysilane | 0.5 |
| 15 | xv | reaction product of polyethylenimine with 3-glycidoxypropyltri-methoxysilane | 1 |
| 16 | xvi | reaction product of polyethylenimine with 3-glycidoxypropyltri-methoxysilane | 2 |
| 17 | xvii | the reaction product of polyethylenimine with 3-glycidoxypropyltri-methoxysilane | 4 |
| 18 | xviii | the reaction product of hydroxyethyl cellulose with 3-glycidoxypropyl-trimethoxysilane | ~30 |

*Mole % of monomer units in the polymer containing the silane functional group.

Example 19

Test Procedure

A synthetic high level nuclear waste liquor is made by adding sodium carbonate, sodium sulfate, sodium hydroxide, sodium aluminate solution (made by digesting alumina trihydrate in caustic), sodium silicate, sodium nitrate, and sodium nitrite to deionized water. The final composition of the liquor is shown in Table 2

TABLE 2

| Species | Concentration (mole/l) |
|---|---|
| NaOH | 4.5 |
| NaNO$_3$ | 1.0 |
| NaNO$_2$ | 1.0 |
| Na$_2$CO$_3$ | 0.25 |
| Na$_2$SO$_4$ | 0.25 |
| Alumina Trihydrate | 0.5 |
| SiO$_2$ | 0.01 |

All of the polymer samples are dissolved in 2% aqueous NaOH prior to addition to the nuclear waste liquor, hydrolyzing any anhydride and trialkoxylsilane groups that have not previously been reacted, transforming the trialkoxylsilane groups into silanol groups or the sodium salts. Into a 125 ml polyethylene bottle, are placed the scale reducing additive (if used) as a 0.5% solution in 2% aqueous NaOH for the lower doses and for the higher doses a 3% solution is used. 120 ml of the above stock synthetic high level nuclear waste solution is then added to the bottle with mixing. The sealed bottle is heated with agitation at 102° C. for 18±2 hours. Up to 24 such tests (bottles) are done at one time. At the end of the 18 hours, the bottles are opened and the solution is filtered (0.45 μm filter). Considerable aluminosilicate scale is observed to form as loose aluminosilicate in the liquor (which may have initially formed on the polyethylene surfaces). In the examples below, the weight of scale formed in the test is expressed as a percentage of the average weight of scale that formed on two comparative blank tests (i.e. no additive used) that are part of the same set of tests.

Using the test procedure outlined above, a series of SMA type polymers reacted with butylamine and containing varying amounts of silane are examined for aluminosilicate scale inhibition activity and the results are reported in Table 3.

TABLE 3

| Polymer | Mole % Silane | Dosage, mg/l | Total Scale Formed, % vs. Blank |
|---|---|---|---|
| Comparative A | 0 | 10 | 104.4 |
| Comparative A | 0 | 50 | 103.9 |
| i | 1 | 10 | 69.4 |
| i | 1 | 50 | 72.6 |
| ii | 3.8 | 10 | 63.3 |
| ii | 3.8 | 50 | 37.1 |
| iii | 7.6 | 10 | 5.2 |
| iii | 7.6 | 50 | 1.0 |

Example 20

Using the test procedure as outlined in Example 19, a series of SMA polymers reacted with tallow amine and diethylamine and containing varying amounts of silane are examined for scale inhibition activity and the results are reported in Table 4.

TABLE 4

| Polymer | Mole % Silane | Dosage, mg/l | Total Scale Formed, % vs. Blank |
|---|---|---|---|
| Comparative B | 0 | 10 | 87.4 |
| Comparative B | 0 | 50 | 95.8 |
| iv | 3.8 | 10 | 59.2 |
| iv | 3.8 | 50 | 54.9 |
| v | 7.5 | 10 | 2.8 |
| v | 7.5 | 50 | 0 |
| vi | 3.8 | 10 | 49.6 |
| vi | 3.8 | 50 | 66.8 |

Example 21

Using the test procedure as outlined in Example 19, a series of polymers made with the silane containing monomer TESPA are examined for scale inhibition activity and the results are reported in Table 5.

TABLE 5

| Polymer | Mole % Silane | Dosage, mg/l | Total Scale Formed, % vs. Blank |
|---|---|---|---|
| Comparative C | 0 | 10 | 102.8 |
| Comparative C | 0 | 50 | 104.2 |
| Comparative E | 0 | 10 | 93.5 |
| Comparative E | 0 | 50 | 101.2 |
| viii | 5 | 10 | 3.1 |

TABLE 5-continued

| Polymer | Mole % Silane | Dosage, mg/l | Total Scale Formed, % vs. Blank |
|---|---|---|---|
| viii | 5 | 50 | 2.9 |
| ix | 5 | 10 | 1.6 |
| ix | 5 | 50 | 2.7 |
| x | 5 | 10 | 2.7 |
| x | 5 | 50 | 1.1 |

Example 22

Using the test procedure as outlined in Example 19, a series of polyether type polymers containing varying amounts of silane are examined for scale inhibition activity and the results are reported in Table 6.

TABLE 6

| Polymer | Mole % Silane | Dosage, mg/l | Total Scale Formed, % vs. Blank |
|---|---|---|---|
| Xi | 2.2 | 10 | 68.0 |
| Xi | 2.2 | 50 | 6.2 |
| xi | 2.2 | 300 | 2.2 |
| xii | 3.1 | 10 | 21.0 |
| xii | 3.1 | 50 | 1.0 |
| xii | 3.1 | 300 | 1.9 |
| Xiii | 3.0 | 10 | 23.3 |
| Xiii | 3.0 | 50 | 6.2 |
| xiii | 3.0 | 300 | 0.7 |

Example 23

Using the test procedure as outlined in Example 19, a series of polyethylenimine type polymers containing varying amounts of silane are examined for scale inhibition activity and the results are reported in Table 7.

TABLE 7

| Polymer | Mole % Silane | Dosage, mg/l | Total Scale Formed, % vs. Blank |
|---|---|---|---|
| Comparative D | 0 | 10 | 102.0 |
| Comparative D | 0 | 50 | 105.5 |
| Comparative D | 0 | 300 | 112.8 |
| xiv | 0.5 | 10 | 43.3 |
| xiv | 0.5 | 50 | 1.6 |
| xiv | 0.5 | 300 | 0 |
| xv | 1 | 10 | 4.2 |
| xv | 1 | 50 | 0 |
| xv | 1 | 300 | 0.1 |
| Xvi | 2 | 10 | 0 |
| Xvi | 2 | 50 | 0 |
| xvi | 2 | 300 | 0 |
| xvii | 4 | 10 | 0 |
| Xvii | 4 | 50 | 0 |
| Xvii | 4 | 300 | 0 |

Example 24

Using the test procedure as outlined in Example 19, a hydroxyethyl cellulose derivative containing silane is examined for scale inhibition activity and the results are reported in Table 8.

TABLE 8

| Polymer | Mole % Silane | Dosage, mg/l | Total Scale Formed, % vs. Blank |
|---|---|---|---|
| Xviii | ~30 | 10 | 17.5 |
| Xviii | ~30 | 50 | 3.0 |
| xviii | ~30 | 300 | 16.9 |

Kraft Pulp Mill Scale Inhibition Testing

Example 25

In order to simulate the conditions found in a typical kraft pulp mill black liquor a synthetic process liquor simulating a typical black liquor is prepared in the following way.

A basic aluminate solution is prepared according to the recipe below by adding the aluminate and NaOH solution to the water and stirring overnight. The solution is then filtered through a 3-μm filter membrane (Pall Versapor-3000 T w/wa, 47 mm):

| | |
|---|---|
| $Na_2O \cdot Al_2O_3 \cdot 3 H_2O$ | 100.0 g |
| 50% NaOH | 146.6 g |
| Deionized water | 753.4 g |
| Total | 1000.0 g |

This basic aluminate solution is used to prepare a simulated kraft black liquor solution according to the recipe and procedure below. Sodium acetate is added to achieve the desired sodium ion concentration. Amounts are in grams and percentages are w/w unless otherwise indicated.

| | |
|---|---|
| Sodium carbonate | 121.9 |
| Sodium sulfate | 32.7 |
| Sodium thiosulfate | 36.4 |
| Sodium hydrosulfide, 60% | 70.9 |
| Sodium acetate | 445.3 |
| 50% sodium hydroxide | 290.7 |
| 29.55% $SiO_2$ | 14.0 |
| Basic aluminate solution | 25.1 |
| Deionized water | 1746 |
| Total | 2783 g = 2.30 liter |

Calculated concentration:
$[CO_3^{2-}] = 0.5$ M
$[SO_4^{2-}] = 0.1$ M
$[S_2O_3^{2-}] = 0.1$ M
$[SH^-] = 0.33$ M
$[Na^+] = 5.7$ M
$[OH^-] = 1.6$ M
$[Si] = 0.03$ M
$[Al] = 0.01$ M The solution is prepared by adding the sodium carbonate, sodium sulfate, sodium thiosulfate, sodium hydrosulfide, and sodium acetate to the water with rapid stirring. After 30 min stirring, the solution is filtered through a coarse glass frit to remove minor amounts of insoluble material. The sodium hydroxide solution, silica solution, and finally basic aluminate solution is added, with stirring after each addition. The solution is used immediately as described below.

For each of Examples 26 to 33, respective polymer solutions of polymers iii (Example 3), v (Example 5), viii (Example 8), ix (Example 9), xi (Example 11), xii (Example 12), xvii (Example 17) and xviii (Example 18) are pre-diluted to 1% (w/w) active concentration in 2% NaOH solution prior to use.

The amount of 1.45 g of a polymer solution, (or 1.45 g of water for the control test), is added to a labeled 4-oz HDPE wide-mouth jar. Then 145 g (120 ml) of simulated kraft black liquor solution is added to each jar before capping and shaking. Each jar then contained a "test solution". The polymer dose is 100 ppm.

The caps on the jars are then loosened so as to be able to relieve pressure, and the jars placed on the floor of a 102° C. oven to simulate heating in a kraft process liquor. After 1.5 hr the caps are tightened and the jars placed on a rotisserie placed inside the oven. After turning on the rotisserie in the oven overnight (16.5 hr), each sample is filtered using a pre-weighed 3-µm filter membrane (Pall Versapor-3000 T w/wa, 47 mm). Each membrane plus any collected solid is washed with about 5-ml water and placed on a 2.5-inch diameter watch glass. A steel tray containing all the watch glasses and membranes is placed in a 102° C. oven for 30 min to dry the filtered solids. Each membrane plus solid is weighed and the weight of the solid calculated by difference. % Scale inhibition is then calculated in the following manner:

$$\% \text{ Scale inhibition} = 100 \times \frac{\text{Weight of scale formed with polymer present}}{\text{Weight of scale formed with polymer absent}}$$

The results of testing polymers in examples 26-33 at 100 ppm are shown in Table 9.

TABLE 9

| Example | Polymer | % Scale Reduction |
|---|---|---|
| 26 | iii | 10.3 |
| 27 | v | 27.5 |
| 28 | viii | 98.0 |
| 29 | ix | 65.1 |
| 30 | xi | 96.1 |
| 31 | xii | 96.5 |
| 32 | xvii | 6.2 |
| 33 | xviii | 28.7 |

Example 34

100.0 gm of 99% PEO (Aldrich, St. Louis, Mo., 2000 number average molecular weight) is dissolved in 50 ml of water at 40° C. 12.55 gm of glycidyloxypropyltrimethoxysilane is added followed by 6.5 gm of 45% potassium hydroxide (KOH) catalyst. The mixture is heated to 60° C. for 2 hours to form the trimethoxysilane ether. This product is dissolved in NaOH solution prior to use in order to form the sodium salt.

The following polymers, Examples 35-38, are reaction products of epoxide end-capped (2,3-epoxypropyl end-capped) polyethylene oxide polymers and aminoalkyltrialkoxysilane and are prepared as follows to give copolymers of the following structure:

A-{CH$_2$CHOHCH$_2$O—(CH$_2$CH$_2$O)$_x$(CH$_2$CH(CH$_3$)O)$_y$(CH$_2$CH$_2$O)$_z$—CH$_2$CHOHCH$_2$O—(B)}$_a$—, wherein a=1-100, x/x+y+z=5-100%, y/x+y+z and z/x+y+z=0-100%, and preferably y and z=0, A is —NH(CH$_2$)$_3$—Si(OEt)$_3$, and B is —N(CH$_2$)$_3$—Si(OEt)$_3$, or y=1-50%.

Each product is then dissolved in 2.5% sodium hydroxide solution to give a solution of the sodium salt (A=—NH(CH$_2$)$_3$—Si(Na)$_3$ and B=—N(CH$_2$)$_3$—Si(Na)$_3$) prior to use. Polymer concentrations are shown below.

Example 35

20 gm of D-400 DGE a PEO diglycidyl ether (MW of PEO=396 corresponding to 9 ethylene oxide units per molecule) from Raschig is reacted with 7.8 gm of aminopropyltriethoxysilane for one hour at 70-80° C. to form the silane ether. The resulting product, has a MW of about 3000 corresponding to the following structure:

A-{CH$_2$CHOHCH$_2$O—(CH$_2$CH$_2$O)$_x$(CH$_2$CH(CH$_3$)O)$_y$(CH$_2$CH$_2$O)$_z$—CH$_2$CHOHCH$_2$O—(B)}$_a$—

Where x=9, y and z=0 and a is about 4, A is —NH(CH$_2$)$_3$—Si(OEt)$_3$, and B is —N(CH$_2$)$_3$—Si(OEt)$_3$.

This product is then dissolved in 2.5% sodium hydroxide solution to give a 20.6% solution of the sodium salt in which A is —NH(CH$_2$)$_3$—Si(ONa)$_3$, and B is —N(CH$_2$)$_3$—Si(ONa)$_3$.

Similarly examples 36, 37, 38 are prepared in the same way using polyethylene oxide (PEO) diglycidyl ethers varying in molecular weight.

Example 36

20.33 gm of Denacol 861 PEO diglycidyl ether from Nagase Chemtex, Osaka, Japan (M$_n$ of PEO=988 (x is about 22)) is reacted at 80° C. for one hour with 8.0 gm of aminopropyltriethoxysilane. The product is dissolved in 2.3% NaOH to give a 30.9% solution of the sodium salt prior to use.

Example 37

14.0 gm of Denacol 821 PEO diglycidyl ether from Nagase Chemtex, Osaka, Japan (M$_n$ of PEO=224 (x is about 5) based on analysis) is reacted at 80° C. for one hour with 16.8 gm of aminopropyltriethoxysilane to form the triethoxysilane ether reaction product. The product is then dissolved in 2.3% NaOH to give a 31.6% solution of the sodium salt prior to use.

Example 38

17.0 gm of Denacol 832 (PEO diglycidyl ether M$_n$ of PEO=390 based on analysis from Nagase Chemtex) is reacted at 80° C. for one hour with 14.1 gm of aminopropyltriethoxysilane. The product is dissolved in 3.6% NaOH to give a 31.3% solution of the sodium salt.

Example 39

The following scale inhibition tests are conducted in accordance with the test procedure set out in Example 19 above (using a simulated high level nuclear waste (HLNW) liquor. The composition of the liquor is described in Table 10. Scale inhibition results are shown in Table 11.

TABLE 10

Liquor composition.

| Species | Concentration (mole/liter) |
|---|---|
| NaOH | 4.800 |
| NaNO$_3$ | 1.940 |
| NaNO$_2$ | 1.370 |
| Na$_2$CO$_3$ | 0.310 |
| Na$_2$SO$_4$ | 0.028 |

TABLE 10-continued

Liquor composition.

| Species | Concentration (mole/liter) |
|---|---|
| Alumina Trihydrate | 0.500 |
| SiO$_2$ | 0.0156 |
| Oxalate | 0.00345 |
| F | 0.0090 |
| Chloride | 0.1000 |
| phosphate | 0.0160 |

TABLE 11

Scale inhibition test results

| Polymer | scale % blank | Scale Inhibition % |
|---|---|---|
| Example 34 (Example 11) | 70 | 30 |
| Example 35 | 1 | 99 |
| Example 36 | 3 | 97 |
| Example 37 | 0 | 100 |
| Example 38 | 2 | 98 |

Table 11 - Test conditions
Polymer Dose: 100 mg/l
Procedure as described above.

Table 11—Test conditions
Polymer Dose: 100 mg/l
Procedure as described above.

What is claimed is:

1. A method for reducing the formation of aluminosilicate containing scale in an industrial process having an alkaline process stream comprising the step of: adding to the alkaline process stream an aluminosilicate containing scale inhibiting amount of a polymer according to the formula:

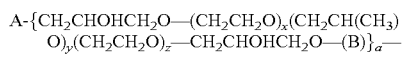
A-{CH$_2$CHOHCH$_2$O—(CH$_2$CH$_2$O)$_x$(CH$_2$CH(CH$_3$)O)$_y$(CH$_2$CH$_2$O)$_z$—CH$_2$CHOHCH$_2$O—(B)}$_a$— wherein,
a=1-100, x/x+y+z=5-100%, y/x+y+z and z/x+y+z=0-100%;
A is chosen from —NH(CH$_2$)$_{1-20}$—Si(OR")$_3$ and —NH—Ar—Si(OR")$_3$;
B is chosen from —N(CH$_2$)$_{1-20}$—Si(OR")$_3$ and —N—Ar—Si(OR")$_3$,
wherein:
Ar is aryl or aralkyl; and
R" is a substituent selected from the group consisting of H; a C1-C20 alkyl, alkenyl, aryl, or aralkyl group optionally substituted; a group I or II metal; and ammonium salts of formula NR1R2R3R4$^+$, wherein R1, R2, R3, R4, are independently selected from H; and a C1-C20 alkyl, alkenyl, aryl, or aralkyl group optionally substituted.

2. The method according to claim 1, wherein R" is selected from H; a C1-C10 alkyl; aryl; a group I or II metal; and ammonium salts of formula NR1R2R3R4$^+$.

3. The method according to claim 2, wherein the alkyl is a C1-C3 alkyl.

4. The method of claim 2, wherein the metal is a Na or K ion salt.

5. The method according to claim 1, wherein y and z=0%.

6. The method according to claim 1, wherein y=1-50%.

7. The method according to claim 1, wherein A is —NH(CH$_2$)$_{1-10}$—Si(OR")$_3$ and B is —N(CH$_2$)$_{1-10}$—Si(OR")$_3$.

8. The method according to claim 7, wherein A is —NH(CH$_2$)$_3$—Si(OR")$_3$ and B is —N(CH$_2$)$_3$—Si(OR")$_3$.

9. A method for reducing the formation of aluminosilicate containing scale in an alkaline process stream comprising the step of adding to the alkaline process stream an aluminosilicate containing scale inhibiting amount of the reaction product of (a) an epoxy-functionalized polyalkylene oxide polymer selected from the group consisting of: epoxide end-capped polyethylene oxide polymers; epoxide end-capped polypropylene oxide polymers; and epoxide end-capped polyethylene-polypropylene oxide copolymers, and (b) an organic compound containing an amino functionality and a —Si(OR")$_3$ functionality, wherein the —Si(OR")$_3$ groups are hydrolyzed to form the salt of a group I or group II metal, or ammonium ion NR1R2R3R4$^+$, wherein R1, R2, R3, R4 are independently selected from the group consisting of H; and a C1-C20 alkyl, alkenyl, aryl, or aralkyl group optionally substituted, wherein the organic compound (b) is chosen from aminoalkyltrialkoxysilanes and aminoaryltrialkoxysilanes.

10. The method according to claim 9, wherein the organic compound (b) is selected from the group consisting of: aminopropyltrimethoxysilane, aminopropyltriethoxysilane, aminoethylaminopropyltrimethoxysilane, aminoethylaminopropyltriethoxysilane, trimethoxysilylpropyldiethylenetriamine, benzylethylenediaminepropyltrimethoxysilane, vinylbenzylethylenediaminepropyltrimethoxysilane aminophenyltrimethoxysilane, phenylaminopropyltrimethoxysilane,
NH$_2$(CH$_2$)$_2$NH(CH$_2$)$_3$—Si(OCH$_3$)$_3$
NH$_2$(CH$_2$)$_2$NH(CH$_2$)$_2$NH(CH$_2$)$_3$—Si(OCH$_3$)$_3$,
bis-(gamma-trimethoxysilylpropyl)amine and combinations thereof.

11. The method according to claim 9, wherein the metal is a Na or K ion salt.

12. The method according to claim 9, wherein the epoxy-functionalized polyalkylene oxide polymer (a) is an epoxide end-capped polyethylene oxide polymer.

13. The method according to claim 12, wherein the organic compound (b) is aminopropyltrimethoxysilane and/or aminopropyltriethoxysilane.

* * * * *